US011847107B2

(12) United States Patent
Helland

(10) Patent No.: US 11,847,107 B2
(45) Date of Patent: Dec. 19, 2023

(54) KEY PERMISSION DISTRIBUTION

(71) Applicant: salesforce.com, inc., San Francisco, CA (US)

(72) Inventor: Patrick James Helland, San Rafael, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/053,300

(22) Filed: Nov. 7, 2022

(65) Prior Publication Data

US 2023/0143075 A1     May 11, 2023

Related U.S. Application Data

(63) Continuation of application No. 17/029,928, filed on Sep. 23, 2020, now Pat. No. 11,494,356.

(51) Int. Cl.
| | |
|---|---|
| *G06F 16/28* | (2019.01) |
| *G06F 16/22* | (2019.01) |
| *G06F 16/23* | (2019.01) |
| *G06F 21/62* | (2013.01) |

(52) U.S. Cl.
CPC ...... *G06F 16/2246* (2019.01); *G06F 16/2379* (2019.01); *G06F 16/284* (2019.01); *G06F 16/289* (2019.01); *G06F 21/6227* (2013.01); *G06F 2221/2145* (2013.01)

(58) Field of Classification Search
CPC .............. G06F 16/2246; G06F 16/289; G06F 16/2379; G06F 16/284
See application file for complete search history.

(56) References Cited

U.S. PATENT DOCUMENTS

| | | | |
|---|---|---|---|
| 5,625,815 A * | 4/1997 | Maier | G06F 16/284 |
| 6,571,276 B1 | 5/2003 | Burns et al. | |
| 6,993,502 B1 | 1/2006 | Gryglewicz et al. | |
| 7,133,845 B1 | 11/2006 | Ginter et al. | |
| 7,174,331 B1 * | 2/2007 | Luo | G06F 16/2456 |
| | | | 707/999.009 |

(Continued)

OTHER PUBLICATIONS

International Search Report and Written Opinion in PCT Appl. No. PCT/US2021/049394 dated Nov. 25, 2021, 14 pages.

*Primary Examiner* — Eliyah S. Harper
(74) *Attorney, Agent, or Firm* — Kowert, Hood, Munyon, Rankin & Goetzel, P.C.; Mark D. Seegers; Dean M. Munyon

(57) ABSTRACT

Techniques are disclosed relating to the distribution of database key permissions. A database system may distribute first permission information to a plurality of database nodes that identifies a distribution of key range permissions to ones of the plurality of database nodes. A given key range permission being distributed to a given database node may permit that database node to write records whose keys fall within a key range associated with the given key range permission. The database system may receive, from a first database node, a request for a first key range permission provisioned to a second database node. The database system may modify the first permission information to derive second permission information that provisions the first key range permission to the first database node instead of the second database node. The database system may distribute the second permission information to ones of the plurality of database nodes.

20 Claims, 8 Drawing Sheets

(56) References Cited

U.S. PATENT DOCUMENTS

| | | |
|---|---|---|
| 7,328,226 B1 | 2/2008 | Karr et al. |
| 8,375,001 B2 | 2/2013 | San Martin Arribas et al. |
| 8,874,621 B1 | 10/2014 | Goodwin et al. |
| 10,496,669 B2 | 12/2019 | Merriman et al. |
| 2006/0072952 A1 | 4/2006 | Walmsley et al. |
| 2006/0164453 A1 | 7/2006 | Silverbrook et al. |
| 2006/0187251 A1 | 8/2006 | Pulver et al. |
| 2007/0083491 A1 | 4/2007 | Walmsley et al. |
| 2007/0185872 A1 | 8/2007 | Ho et al. |
| 2013/0332484 A1 | 12/2013 | Gajic |
| 2014/0195492 A1 | 7/2014 | Wilding |
| 2016/0314162 A1* | 10/2016 | Tarta ............... G06F 16/273 |
| 2017/0041296 A1 | 2/2017 | Ford et al. |
| 2017/0091246 A1* | 3/2017 | Risvik ............ G06F 16/2471 |
| 2018/0096045 A1 | 4/2018 | Merriman et al. |
| 2018/0329958 A1* | 11/2018 | Choudhury ....... G06F 16/2456 |
| 2019/0205344 A1* | 7/2019 | Gold ............. G06F 16/90348 |
| 2019/0347656 A1 | 11/2019 | Lu et al. |
| 2020/0005189 A1 | 1/2020 | Cuomo et al. |
| 2020/0125770 A1 | 4/2020 | LeMay et al. |

\* cited by examiner

KEY PERMISSION DISTRIBUTION

PRIORITY CLAIM

The present application is a continuation of U.S. application Ser. No. 17/029,928, entitled "KEY PERMISSION DISTRIBUTION," filed Sep. 23, 2020 (now U.S. Pat. No. 11,494,356), the disclosure of which is incorporated by reference herein in its entirety.

BACKGROUND

Technical Field

The present disclosure relates generally to database systems and, more specifically, to the distribution of database key permissions among database nodes.

Description of the Related Art

Modern database systems routinely implement management systems that enable users to store a collection of information in an organized manner that can be efficiently accessed and manipulated. In some cases, these management systems maintain a log-structured merge tree (LSM tree) having multiple levels that each store information in database records as key-value pairs. An LSM tree typically includes two high-level components: an in-memory cache and a persistent storage. During operation, a database system receives transaction requests to process transactions that include writing database records to the persistent storage. The database system initially writes the database records into the in-memory cache before later flushing them to the persistent storage.

DETAILED DESCRIPTION

Figure 1:
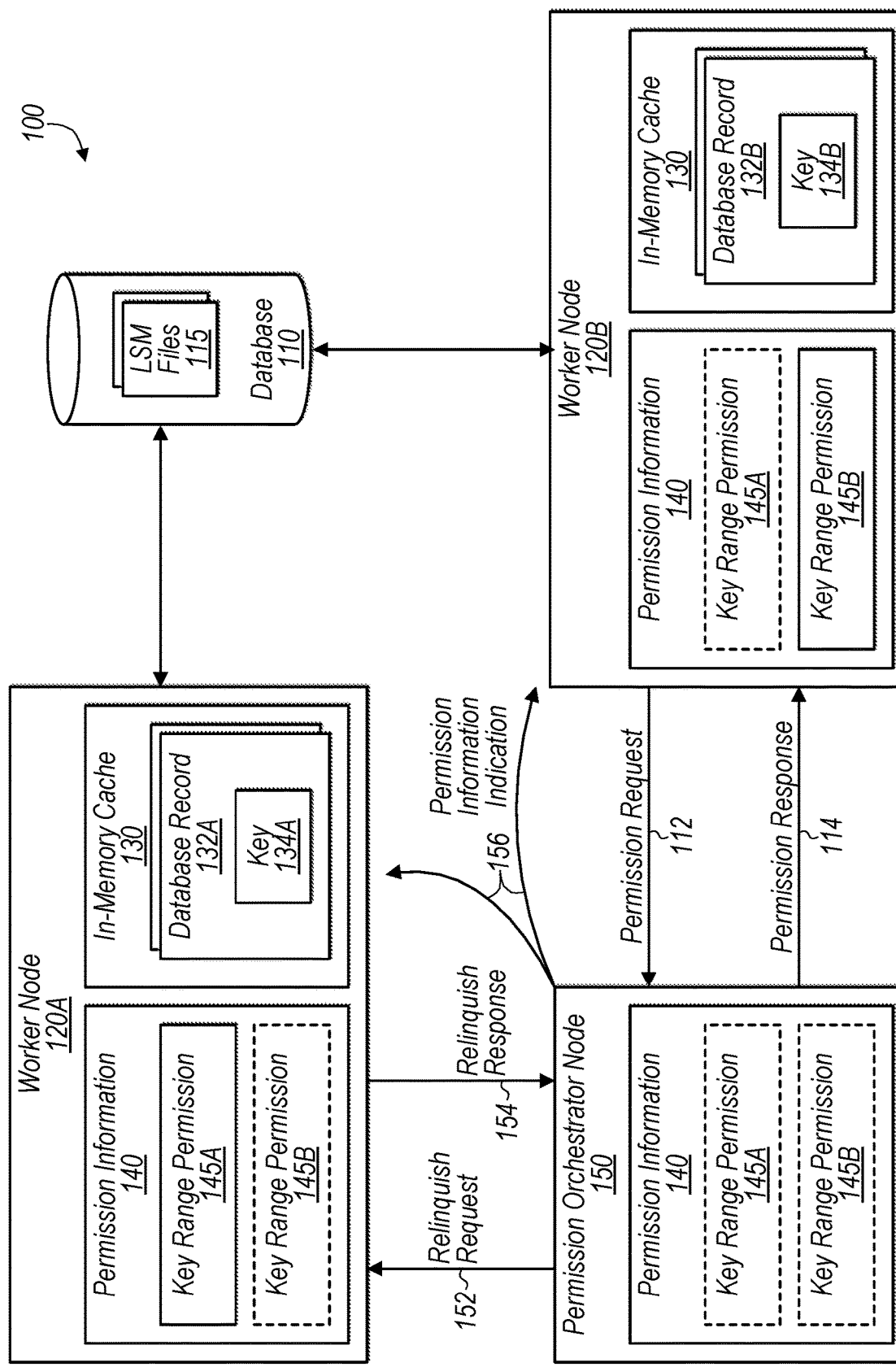
FIG. 1 is a block diagram illustrating example elements of a system that includes a permission orchestrator node and worker nodes, according to some embodiments.

As explained above, a modern database system may maintain an LSM tree that includes database records having key-value pairs. In many cases, the database system includes a single active database node (and several standby database nodes) that is responsible for writing database records to the persistent storage component of the LSM tree. But in some cases, the database system includes multiple active database nodes that are writing database records to the LSM tree. The multiple active database nodes may share a common persistent storage, but have their own individual in-memory caches. In such implementations, database records that are written by an active database node to its individual in-memory cache are not visible to the other active database nodes until those records are flushed to the common persistent storage.

In implementations with multiple active database nodes, there exists the possibility that two or more database nodes will write, at close to the same time, records for the same database key if those database nodes are not restricted in some way. (In contrast, there is little concern of this scenario in implementations with a single active database node as it has a local lock manager that ensures changes from local transactions are coordinated and do not conflict.) Accordingly, in some multiple-active-node implementations, one of the active database nodes can be provisioned a database key permission for the particular database key that permits that database node to write records for that database key. The other active database nodes, however, are not provisioned the database key permission and therefore cannot write records for the particular database key. But in some cases, it may be desirable to re-provision the database key permission to another active database node from the owner active database node. As an example, if the owner database node is overwhelmed with other database work and there is a pending transaction that involves writing a record for the particular database key, then it may be desirable to offload that pending transaction to another database node. The present disclosure addresses, among other things, this technical problem of being able to ensure that multiple database nodes are not writing records for the same key at relatively the same time, while also allowing for database key permissions to be redistributed to meet the demands of the database system.

More specifically, this disclosure describes various techniques for orchestrating the distribution of database key permissions between multiple database nodes of a database system. In various embodiments described below, a database system includes a permission orchestrator node that orchestrates the distribution of key permissions among worker nodes that are capable of writing database records to a database of the database system. During operation of the database system, a first worker node may receive a request to perform a transaction that involves writing a record for a particular database key (e.g., a database key "XYZ"). In various embodiments, the first worker node initially accesses permission information from the permission orchestrator node (if the first worker node has not previously obtained the permission information) and determines if it has permission to write a database record for the particular database key. In some cases, the permission information may indicate that the first worker node has been provisioned the relevant key permission and thus the first worker node may write the record. The first worker node may also ensure that another record has not been committed for the particular database key within a certain timeframe before it writes the record for the transaction. In other cases, the permission information may indicate that the relevant key permission has not been provisioned or it has been provisioned to another worker node. Thereafter, the first worker node issues a request to the permission orchestrator node for the relevant key permission. In some cases, the first worker node may request a key range permission that includes the relevant database key permission (e.g., the key range "XY", which includes database key "XYZ").

Upon receiving the request from a given worker node, in various embodiments, the permission orchestrator node initially determines whether the relevant key permission is owned by another worker node. If the relevant key permission is not owned, then the permission orchestrator node may generate updated permission information that provisions the relevant key permission to the first worker node. The permission orchestrator node may then distribute the permission information to the worker nodes of the database system. In some embodiments, the permission orchestrator node may provision a range of key permissions (this may be called a "key range permission") that includes the relevant key permissions. As an example, the permission orchestrator node may provision key permissions for the key range "XY" (which encompasses any key that starts with "XY", including the particular database key "XYZ"). If, however, a second worker node owns the relevant key permission, then the permission orchestrator node sends a relinquish request to the second worker node to relinquish the relevant key permission, in some embodiments.

Upon receiving the relinquish request, in various embodiments, the second worker node determines if there are any active transactions at the second worker node that have locked the relevant key permission for a record commit. An active transaction may lock a key permission if it intends to commit a record for the database key that corresponds to that key permission. A locked key permission may not be used by another active transaction or relinquished back to the permission orchestrator node while the key permission is locked/held. If the relevant key permission is being held by an active transaction running on the second worker node, then the second worker node may wait until the transaction is completed before returning the key permission. In some embodiments, the second worker node may relinquish a set of key permissions that includes the relevant key permission. In some embodiments, the second worker node also returns history information that identifies a transaction commit number ("XCN") associated with the relinquished key permission. The XCN may be indicative of when the latest database record was committed for the relinquished key permission (or the set of key permissions that includes the relinquished key permission). Consider an example in which the latest committed database record for the key range "XY" was committed with an XCN of "501." Consequently, the second worker node may return history information that indicates a max XCN of "501" for the relinquished key permission "XYZ." After ensuring that the relevant key permission has been revoked at the second worker node, in various embodiments, the permission orchestrator node provisions the relevant key permission to the first worker node by updating permission information and distributing it to the worker nodes. The update permission information may include the history information returned by the second worker node so that the other worker nodes can determine if they may commit a record for a particular database key.

Upon receiving the relevant key permission, the first worker node may use the permission information to determine whether a record may have been committed for the relevant key permission during a certain timeframe—e.g., whether the second worker node committed a record for the relevant key permission while it owned the key permission. If it appears that a record may have been committed, then the first worker node may communicate with the second worker node in order to determine if a record actually has been committed. If a record has been committed, then the first worker node may abort its transaction, ensuring two transactions do not conflict; otherwise, the first worker node writes a record for the relevant key permission into its in-memory cache. Upon relinquishing the key permission (e.g., in response to receiving a relinquish request), in various embodiments, the first worker node notifies the permission orchestrator node about the writing and committing of that record so that the other worker nodes can be made aware upon acquiring the key relevant permission. In some embodiments, the relevant key permission identifies the record commit. As a result, key permissions may simultaneously be a locking and concurrency protection while also being an enumeration of the locations for recent updates.

In this manner, database key permissions can be distributed and redistributed between worker nodes by the permission orchestrator node. This may result in a "tug-of-war" scenario in which worker nodes "tug" over database key permissions in order to write database records for transactions of the system. That is, a worker node may acquire a particular key permission, write a record for the particular key permission, relinquish the particular key permission, and then later reacquire the particular key permission for another record write. Consequently, the particular key permission may be "pulled" around by worker nodes that are attempting to write records using the particular key permission.

These techniques may be advantageous as they allow for a database system to be implemented with multiple active database nodes while ensuring that multiple database nodes are not writing records for the same database key at close to the same time, causing a violation of transactional isolation and potentially introducing application visible anomalies. That is, through a key permission being allocated to at most one database node at a time, other database nodes are prevented from writing database records having a key associated with the key permission. These techniques may further be advantageous as they allow for key permissions to be moved among the active database nodes so that one active database node does not have to process all the work associated with a database key. This can result in transactions being processed more quickly as compared to prior database system implementations. An exemplary application of these techniques will now be discussed, starting with reference to FIG. 1.

Turning now to FIG. 1, a block diagram of a system 100 is shown. System 100 includes a set of components that may be implemented via hardware or a combination of hardware and software routines. In the illustrated embodiment, system 100 includes a database 110 having LSM files 115, worker nodes 120A and 120B, and a permission orchestrator node 150. As further illustrated, worker nodes 120 and permission orchestrator node 150 include permission information 140 that defines key range permission 145A and 145B. Also as illustrated, worker nodes 120 include respective in-memory caches 130 storing database records 132 associated with keys 134. In some embodiments, system 100 is implemented differently than shown. For example, permission orchestrator node 150 may also implement the functionality of a worker node 120 in addition to orchestrating the distribution of key range permissions 145. Moreover, while the techniques of this disclosure are discussed with respect to LSM trees, the techniques can be applied to other types of database implementations in which multiple nodes are writing and committing records for the database.

System 100, in various embodiments, implements a platform service (e.g., a customer relationship management (CRM) platform service) that allows users of that service to develop, run, and manage applications. System 100 may be a multi-tenant system that provides various functionality to multiple users/tenants hosted by the multi-tenant system. Accordingly, system 100 may execute software routines from various, different users (e.g., providers and tenants of system 100) as well as provide code, web pages, and other data to users, databases, and other entities associated with system 100. As shown, for example, system 100 includes worker nodes 120 that can store, manipulate, and retrieve data from LSM files 115 of database 110 on behalf of users of system 100.

Database 110, in various embodiments, is a collection of information that is organized in a manner that allows for access, storage, and manipulation of that information. Accordingly, database 110 may include supporting software that allows for worker nodes 120 to carry out operations (e.g., accessing, storing, etc.) on information that is stored at database 110. In some embodiments, database 110 is implemented by a single or multiple storage devices connected together on a network (e.g., a storage attached network (SAN)) and configured to redundantly store information to prevent data loss. The storage devices may store data persistently and thus database 110 may serve as a persistent storage. In various embodiments, database records 132 that are written into LSM files 115 by one worker node 120 are accessible by the other worker nodes 120. LSM files 115 may be stored as part of a log-structured merge tree (an LSM tree) implemented at database 110.

An LSM tree, in various embodiments, is a data structure storing LSM files 115 in an organized manner that uses a level-based scheme. The LSM tree may comprise two high-level components: an in-memory component implemented at in-memory caches 130 and an on-disk component implemented at database 110. In some embodiments, in-memory caches 130 are considered to be separate from the LSM tree. Worker nodes 120, in various embodiments, initially write database records 132 into their in-memory cache 130. As caches 130 become full and/or at particular points in time, worker nodes 120 may flush their database records 132 to database 110. As part of flushing the database records 132, in various embodiments, worker nodes 120 write the database records 132 into a new set of LSM files 115 at database 110.

LSM files 115, in various embodiments, are sets of database records 132. A database record 132 may be a key-value pair comprising data and a corresponding database key 134 that is usable to look up that database record. For example, a database record 132 may correspond to a data row in a database table where the database record 132 specifies values for one or more attributes associated with the database table. In various embodiments, a file 115 is associated with one or more database key ranges defined by the keys 134 of the database records 132 that are included in that LSM file 115. Consider an example in which a file 115 stores three database records 132 associated with keys 134 "XYA," "XYW," and "XYZ," respectively. Those three keys 134 span a database key range of XYA→XYZ and thus that LSM file 115 is associated with that database key range.

Worker nodes 120, in various embodiments, are hardware, software, or a combination thereof capable of providing database services, such as data storage, data retrieval, and/or data manipulation. These database services may be provided to other components in system 100 or to components external to system 100. For example, worker node 120A may receive a database transaction request to perform one or more database tasks—this request might be received from an application server that is attempting to access a set of database records 132. The transaction request may specify a SQL SELECT command for selecting one or more rows from one or more database tables. The contents of a row may be defined in a database record 132 and thus worker node 120A may return one or more database records 132 that correspond to the selected one or more table rows. In various cases, a database transaction request may instruct a worker node 120 to write one or more database records 132 to the LSM tree. The worker node 120, in various embodiments, initially writes database records 132 to its in-memory cache 130 before flushing those database records to database 110.

In-memory caches 130, in various embodiments, are buffers that store data in memory (e.g., random access memory) of worker nodes 120. HBase™ Memstore is an example of an in-memory cache 130. As mentioned, a worker node 120 may initially write a database record 132 in its in-memory cache 130. In some cases, the latest/newest version of a row in a database table may be found in a database record 132 that is stored in an in-memory cache 130. Database records 132, however, that are written into a worker node 120's in-memory cache 130 are not visible to the other worker nodes 120, in various embodiments. That is, the other worker nodes 120 do not know, without asking, what information is stored within the in-memory cache 130 of the worker node 120. In order to prevent database record conflicts as one worker node 120 may not know about the database records 132 written by another worker node 120, in various embodiments, worker nodes 120 are provisioned with permission information 140 that controls which records 132 can be written by a given worker node 120. As such, permission information 140 can prevent two or more worker nodes 120 from writing database records 132 for the same database key 134 within a particular time interval so as to prevent the worker nodes 120 from flushing conflicting database records 132 to database 110.

Permission information 140, in various embodiments, is information that identifies key range permissions 145 and a corresponding set of owners for those key range permissions. As shown for example, worker node 120A is provisioned key range permission 145A (shown with a solid box at worker node 120A) and worker node 120B is provisioned key range permission 145B (shown with a solid box at worker node 120B). A key range permission 145, in various embodiments, indicates a range of key permissions that correspond to a range of database keys 134 for which the owning worker node 120 is permitted to write database records 132. As an example, key range permission 145A may indicate a key permission for key 134A. As a result, worker node 120A can write database record 132A into its in-memory cache 130 as shown. In various embodiments, a key permission is provisioned to at most one worker node 120 at any given time. Consider an example in key range permission 145B indicates a key permission for key 134B. While that key permission is provisioned to worker node 120B, worker node 120A is not permitted to write records 132 having key 134B. In order to be permitted to write records 132 for a particular key 134, in various embodiments, worker nodes 120 may issue permission requests 112 to permission orchestrator node 150 that specify the particular key 134. In various cases, permission request 112 may specify multiple keys 134 (e.g., a key range).

Permission orchestrator node 150, in various embodiments, facilitates the distribution of key permissions between worker nodes 120 and ensures that at most one worker node 120 has ownership of a key permission. As part of facilitating the distribution of key permissions, in various embodiments, permission orchestrator node 150 may update permission information 140 in response to receiving permission requests 112. As shown, permission orchestrator node 150 receives a permission request 112 from worker node 120B. In response to receiving the permission request 112, permission orchestrator node 150 may initially determine whether the key permission for the requested database key 134 has already been provisioned. If it has not been provisioned, then permission orchestrator node 150 may update permission information 140 to provision the key permission to worker node 120B and may notify worker node 120B of the update via a permission response 114 and the other worker nodes 120 via a permission information indication 156. In various embodiments, all worker nodes 120, including worker node 120B, are notified via permission information indication 156.

If the key permission (or key range permission 145 if a key range is requested) has been provisioned, then permission orchestrator node 150 may identify the owning worker node 120 and issue a relinquish request 152 to that worker node 120. As an example, worker node 120B may issue a permission request 112 for a key permission associated with key 134A. Permission orchestrator node 150 may determine that the key permission is part of key range permission 145A that has already been provisioned to worker node 120A. As such, permission orchestrator node 150 may issue a relinquish request 152 to worker node 120A. When relinquishing a key permission, in various embodiments, a worker node 120 ensures that the key-permission-to-be-relinquished is not being used. Thereafter, the worker node 120 may relinquish the key permission and notify permission orchestrator node 150 via a relinquish response 154. In some cases, the worker node 120 may include history information in the relinquish response 154 that indicates if a record 132 might have been committed using the relinquished key permission (or the relinquished key range permission 145 in some cases).

In response to receiving the relinquish response 154, permission orchestrator node 150 may update permission information 140 to provision the key permission to worker node 120B and may notify worker node 120B of the update via a permission response 114 and the other worker nodes 120 via a permission information indication 156. Permission orchestrator node 150 may thus distribute and redistribute ownership of key permissions to worker nodes 120 by updating permission information 140 in response to permission requests 112, and propagating the updated permission information 140 to worker nodes 120.

Figure 2:
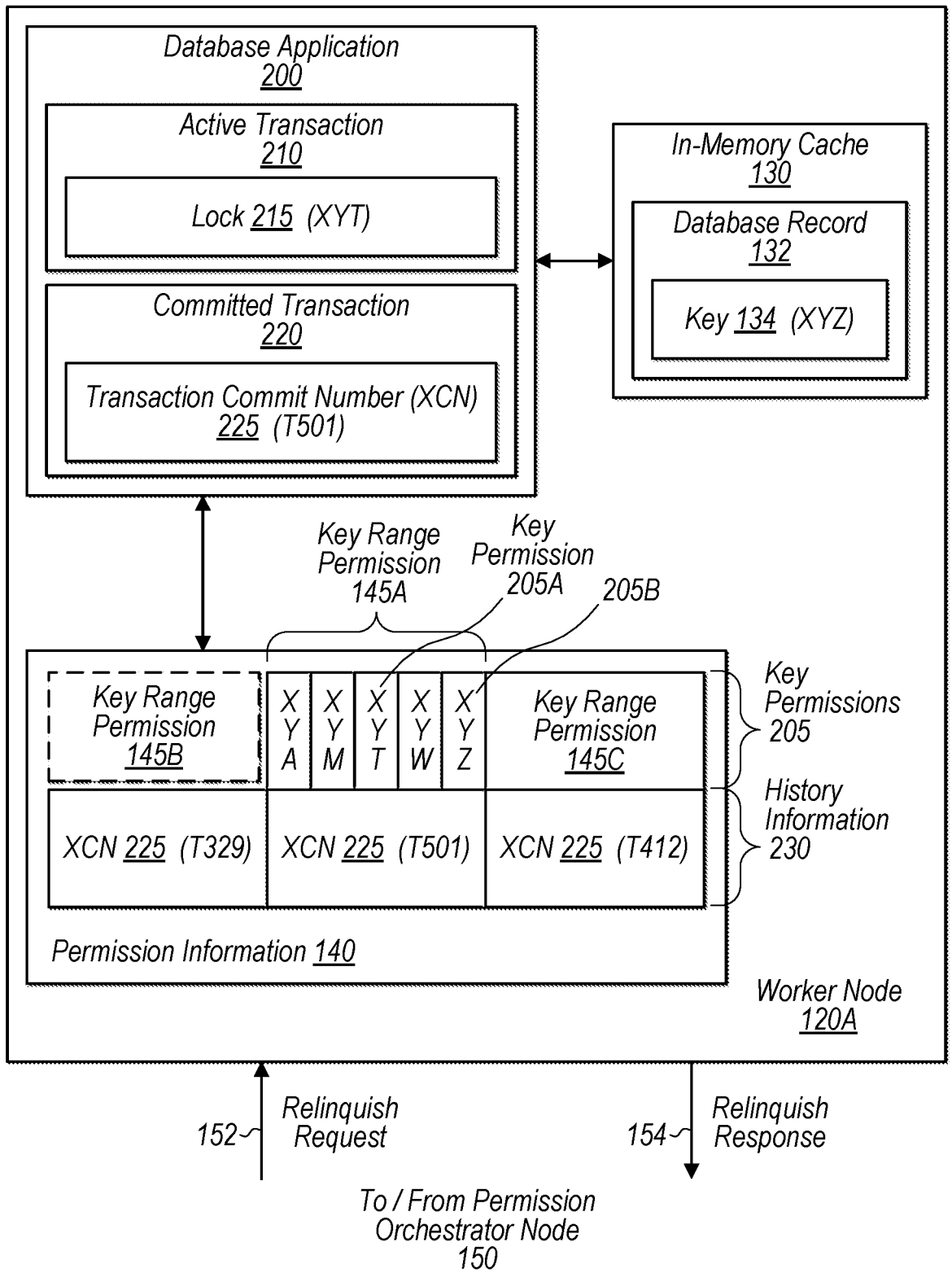
FIG. 2 is a block diagram illustrating example elements of a worker node relinquishing key permissions, according to some embodiments.

Turning now to FIG. 2, a block diagram of an example layout relating to a worker node 120 relinquishing key permissions is shown. In the illustrated embodiment, worker node 120A includes an in-memory cache 130, permission information 140, and a database application 200. As further shown, database application 200 is processing an active transaction 210 that holds a lock 215, and a committed transaction 220 having an associated transaction commit number (XCN) 225. Also as shown, permission information 140 includes key range permissions 145A-C having key permissions 205, and corresponding history information 230 that specifies XCNs 225. In some embodiments, worker node 120A is implemented differently than shown. As an example, database application 200 may process multiple active transactions 210 and multiple committed transactions 220.

Database application 200, in various embodiments, is a set of program instructions that are executable to manage database 110, including managing an LSM tree built around database 110. Accordingly, database application 200 may process database transactions to read records 132 from and write records 132 to the LSM tree. To assist in processing database transactions, in various embodiments, database application 200 maintains metadata describing the structural layout of the LSM tree, including where files 115 are stored at database 110 and what records 132 may be included in those files 115. In some embodiments, the metadata includes tries that correspond to the files 115. Database application 200 may use the metadata to perform quicker and more efficient key range lookups as part of processing database transactions.

As discussed, database application 200 may receive requests to perform transactions to read and write database records 132. Upon receiving a transaction request, database application 200 may initiate an active transaction 210 based on the received transaction request. An active transaction 210, in various embodiments, refers to an in-progress transaction in which database application 200 is writing database records 132 into in-memory cache 130. While a transaction is an active transaction 210, the database records 132 written for that transaction have not been committed and may not be readable/accessible by another entity than the worker node 120 that wrote them. In various cases, database application 200 may decide to perform a rollback of an active transaction 210 and thus database records 132 written for the active transaction 210 are not committed and are flushed. For example, if database application 200 is not permitted, based on a set of criteria (e.g., the time period analysis discussed in greater detail with respect to FIG. 4), to write a particular database record 132, then database application 200 may rollback the active transaction 210 that includes writing that database record 132. In some cases, database application 200 may decide to perform a rollback of only a sub-portion (or sub-transaction) of an active transaction 210.

In order to write database records 132 when processing a given active transaction 210, in various embodiments, database application 200 determines whether worker node 120A has the appropriate permissions 205 and acquires locks 215 on those permission 205 before writing the database records 132. Consider an example in which the illustrated active transaction 210 involves writing a database record 132 having a key 134 with a value of "XYT" (referred to as "key 134 (XYT)"). Database application 200 may first examine permission information 140 to determine whether a permission key 205 for key 134 (XYT) has been provisioned to worker node 120A. A key permission 205, in various embodiments, identifies an associated key 134 and the owner of that key 134. As shown, key range permissions 145A and 145C (illustrated with solid boxes) have been provisioned to worker node 120A and key range permission 145B (illustrated with a dashed box) has not been provisioned to worker node 120A. Consequently, for the illustrated embodiment, database application 200 determines that key permission 205A identifies worker node 120A as the owner of key 134 (XYT); however, in other cases, worker node 120A may not be the owner and thus may have to request ownership of key 134 (XYT)—an example of requesting ownership is discussed in greater detail with respect to FIG. 4.

After determining that the desired key permission 205 has been provisioned to a worker node 120, in various embodiments, the worker node 120 acquires a lock 215 on the associated key 134 when writing a database record 132 having that key 134. Continuing with the previous example, worker node 120A may acquire a lock 215 (XYT) on key 134 (XYT). A lock 215, in various embodiments, prevents another entity (e.g., another worker node 120) from writing a database record 132 having the associated key 134 and further may prevent the associated key permission 205 from being revoked and re-provisioned to another entity. Once a lock 215 has been acquired, a worker node 120 may write a database record 132 for the corresponding key 134. As discussed in greater detail with respect to FIG. 4, before writing a database record 132, a worker node 120 may further determine if another worker node 120 committed a database record 132 for the same database key 134 within a particular time period based on XCNs 225.

After processing an active transaction 210 (e.g., after writing all the requested database records 132 for the transaction), a worker node 120 may commit that transaction, resulting in a committed transaction 220. As part of the commit process, in various embodiments, a worker node 120 stamps each database record 132 of the transaction with a transaction commit number (XCN) 225. As illustrated, committed transaction 220 has an XCN 225 of T501 (referred to as "XCN 225 (T501)"). Accordingly, each record 132 associated with committed transaction 220 may include metadata identifying XCN 225 (T501). XCN 225, in various embodiments, is a monotonically increasing value and therefore can be indicative of a time period. That is, during operation, system 100 may periodically increment a database system XCN 225 that is assigned to a transaction at the time of commit. Since the database system XCN 225 is being periodically incremented, two committed transactions 220 may be associated with different XCNs 225. For example, a first committed transactions220 may be assigned an XCN 225 (T501) and a second committed transaction 220 may be assigned an XCN 225 (T412). Since the database system XCN 225 is being incremented, a worker node 120 (or another entity) can determine that the second committed transaction 220 temporally occurred before the first committed transaction 220 (T412<T501). In various embodiments, database records 132 that have been committed become available to other worker nodes 120 upon request and are eventually written to files 115 at database 110.

As part of the commit process, in various embodiments, a worker node 120 also updates history information 230 based on the XCN 225 of the transaction being committed. In various embodiments, history information 230 identifies, for a key permission 205 and/or a key range permission 145, the XCN 225 associated with the most recent record commit involving that key permission 205/key range permission 145—that XCN 225 is referred to as the "maximum XCN" or "latest XCN" for that key permission 205/key range permission 145. Consider an example in which database record 132 with key 134 (XYZ) was committed for the illustrated committed transaction 220. Since worker node 120A holds key permission 205B and no other worker node 120 has permission to write for key 134 (XYZ) while worker node 120A holds key permission 205B, database record 132 is the most recent committed record 132 for key 134 (XYZ). Accordingly, worker node 120A may update history information 230 to associate key permission 205B (or key range permission 145A, which includes key permission 205B) with XCN 225 (T501).

History information 230 may be updated in different ways. In various cases, a worker node 120 may update history information 230 to associate each key permission 205 used in a given transaction at the worker node 120 with the XCN 225 of that given transaction. In some cases, a set of key permissions 205 may be grouped and provisioned as a key range permission 145, and a portion of history information 230 may be linked to that key range permission 145. Accordingly, a worker node 120 may update history information 230 to associate a key range permission 145 with an XCN 225—this can be referred to as "a key range XCN." As depicted, key range permission 145C is associated with an XCN 225 (T412). Thus, the latest committed database record 132 for key range permission 145C occurred in a committed transaction 220 having XCN 225 (T412). But other records 132 for key range permission 145C may be associated with different, lesser XCNs 225 and, as such, were committed at an earlier point in time, potentially by another worker node 120. As discussed in greater detail with respect to FIG. 4, a worker node 120 may use history information 230 to determine whether to abort a record write.

During operation, worker node 120A may receive a relinquish request 152 to relinquish one or more key permissions 205 (or key range permissions 145). A relinquish request 152 may be received from permission orchestrator node 150 and may identify the one or more key permissions 205 to be relinquished. In response to receiving a relinquish request 152, in various embodiments, worker node 120A initially prevents any new transactions from acquiring locks 215 on the requested key permissions 205. Worker node 120A may then determine whether any active transactions 210 have locks 215 on the requested key permissions 205. If there are no locks 215 associated with those key permissions 205, then worker node 120A may send a relinquish response 154 back to permission orchestrator node 150. In some cases, worker node 120A may relinquish a key permission 205, but keep key permissions 205 for a key range that includes the relinquished key permission 105. For example, worker node 120A may relinquish key permission 205 "XYZ", but keep the other remaining key permissions 205 for key range "XY." A relinquish response 154, in various embodiments, includes an indication that the requested key permissions 205 have been relinquished and thus will not be used for transactions unless the key permissions 205 are re-provisioned to worker node 120A. In some cases, a worker node 120 may relinquish a set of key range permissions 145 that includes the requested one or more key permissions 205 and thus a relinquish response 154 may include an indication of the relinquished key range permissions 145. For example, a relinquish request 152 may specify key permission 205B, but worker node 120A may decide to relinquish the entire key range permission 145A. A relinquish response 154 may also include history information 230 that provides an indication as to what relinquished key permissions 205 were used to commit records 132 while the worker node 120 was provisioned those key permissions 205.

In some cases, worker node 120A may determine that there are active transactions 210 holding locks 215 on the requested key permissions 205. For example, a relinquish request 152 might identify key permission 205A, which has been acquired by active transaction 210 of the illustrated embodiment. In some embodiments, worker node 120A waits for the relevant active transactions 210 to commit or abort. Thereafter, worker node 120A may provide a relinquish response 154 to orchestrator node 150 for the requested key permissions 205. If a worker node 120 intends to relinquish a key range permission 145, but there are locks 215 on non-requested key permissions 205 within that key range permission 145, then the worker node 120 may keep the locked key permissions 205 but relinquish the rest of the key range permission 145. As an example, worker node 120A may receive a relinquish request 152 identifying key permission 205B. Worker node 120A may decide to return key range permission 145A. But because key permission 205A (which is not the requested key permission) is locked by active transaction 210, worker node 120A may return all the key permissions 205 of key range permission 145A except key permission 205A. Worker node 120A may return key permission 205A after there are no locks 215 held on key permission 205A.

Figure 3:
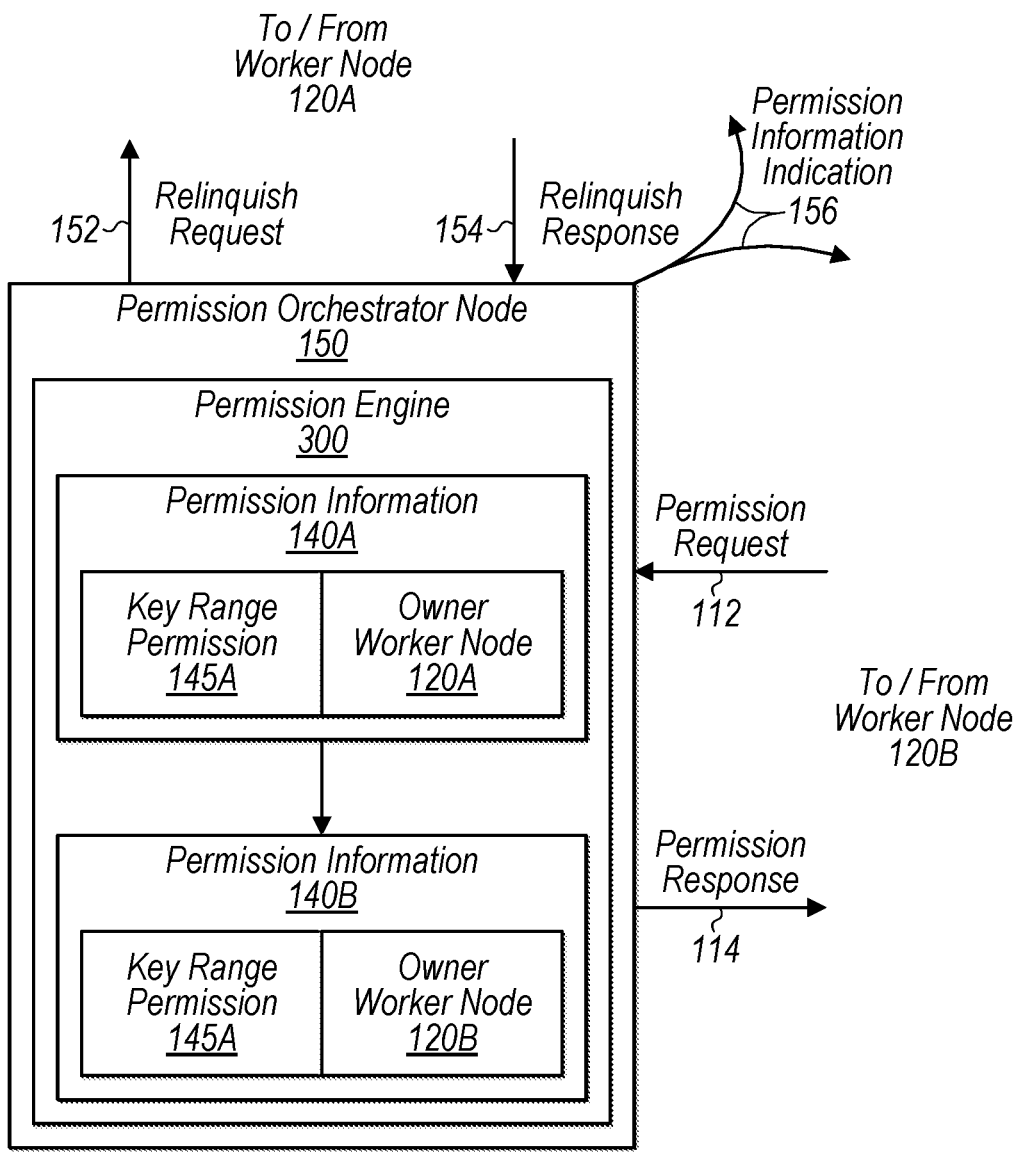
FIG. 3 is a block diagram illustrating example elements of a permission orchestrator node, according to some embodiments.

Turning now to FIG. 3, a block diagram of an example permission orchestrator node 150 is shown. In the illustrated embodiment, permission orchestrator node 150 includes a permission engine 300 having permission information 140. In some embodiments, permission orchestrator node 150 is implemented differently than shown—e.g., permission orchestrator node 150 may be as worker node 120 and thus further include database application 200 and an in-memory cache 130.

As shown, permission orchestrator node 150 receives a permission request 112 issued by worker node 120B. Permission request 112 may identify one or more key permissions 205 or key range permissions 145 that worker node 120B seeks to acquire. For example, permission request 112 from worker node 120B may identify key range permission 145A. In response to receiving a permission request 112, permission engine 300 may process the permission request 112 and return a permission response 114 that indicates whether the requestor has received the requested key permissions 205.

Permission engine 300, in various embodiments, is a set of software routines executable to facilitate the provisioning and relinquishing of key permissions 205 between worker nodes 120. In response to receiving a permission request 112, in various embodiments, permission engine 300 initially determines if the requested key permissions 205 have been provisioned to a worker node 120. As depicted, permission engine 300 stores permission information 140 and thus permission engine 300 may consult permission information 140 to determine whether the requested key permissions 205 have been provisioned. If those key permissions 205 have not been provisioned, then permission engine 300 may generate updated permission information 140 that allocates the requested key permissions 205 to the requesting worker node 120. Then, permission engine 300 may distribute the updated permission information 140 to worker nodes 120. In some embodiments, permission engine 300 issues, to worker nodes 120, a permission information indication 156 that includes the updated permission information 140. In yet some embodiments, a permission information indication 156 indicates that permission information 140 has been updated. Consequently, worker nodes 120 may retrieve the updated permission information 140 from permission orchestrator node 150 in response to receiving the permission information indication 156.

If the requested key permissions 205 have been provisioned to a worker node 120, then permission engine 300 may issue a relinquish request 152 to the worker node 120. For example, permission engine 300 may determine from a first version (e.g., permission information 140A) of permission information 140 that key range permission 145A has been provisioned to worker node 120A (as shown). Accordingly, permission engine 300 may send a relinquish request 152 to worker node 120A to relinquish key range permission 145A as discussed above. In response to receiving a relinquish response 154 indicating that the requested key permissions 205 have been relinquished, in various embodiments, permission engine 300 updates the first version to a second version (e.g., permission information 140B) of permission information 140 in which the requested key permissions 205 are allocated to the requesting worker node 120. As shown, permission engine 300 updates permission information 140A in which worker node 120A is the owner of key range permission 145A to permission information 140B in which worker node 120B is the owner of key range permission 145A. Permission engine 300 may then issue a permission information indication 156 for the updated permission information 140. In some embodiments, permission engine 300 issues, to the requesting worker node 120, a permission response 114 that includes the updated permission information 140.

When updating permission information 140 to modify key permission 205 ownership, in various embodiments, permission engine 300 also updates history information 230 included in permission information 140. As mentioned, a relinquish response 154 may identify XCNs 225 for those key permissions 205 or key range permissions 145 that were used in transactions at the relinquishing worker node 120. The XCN 225 provided for a key permission 205 (or key range permission 145) may represent the most recent time period for which a record 132 was committed for the corresponding key 134 across the entire system 100. Accordingly, permission engine 300 may update history information 230 to include the XCNs 225 that are identified in a received relinquish response 154.

Figure 4:
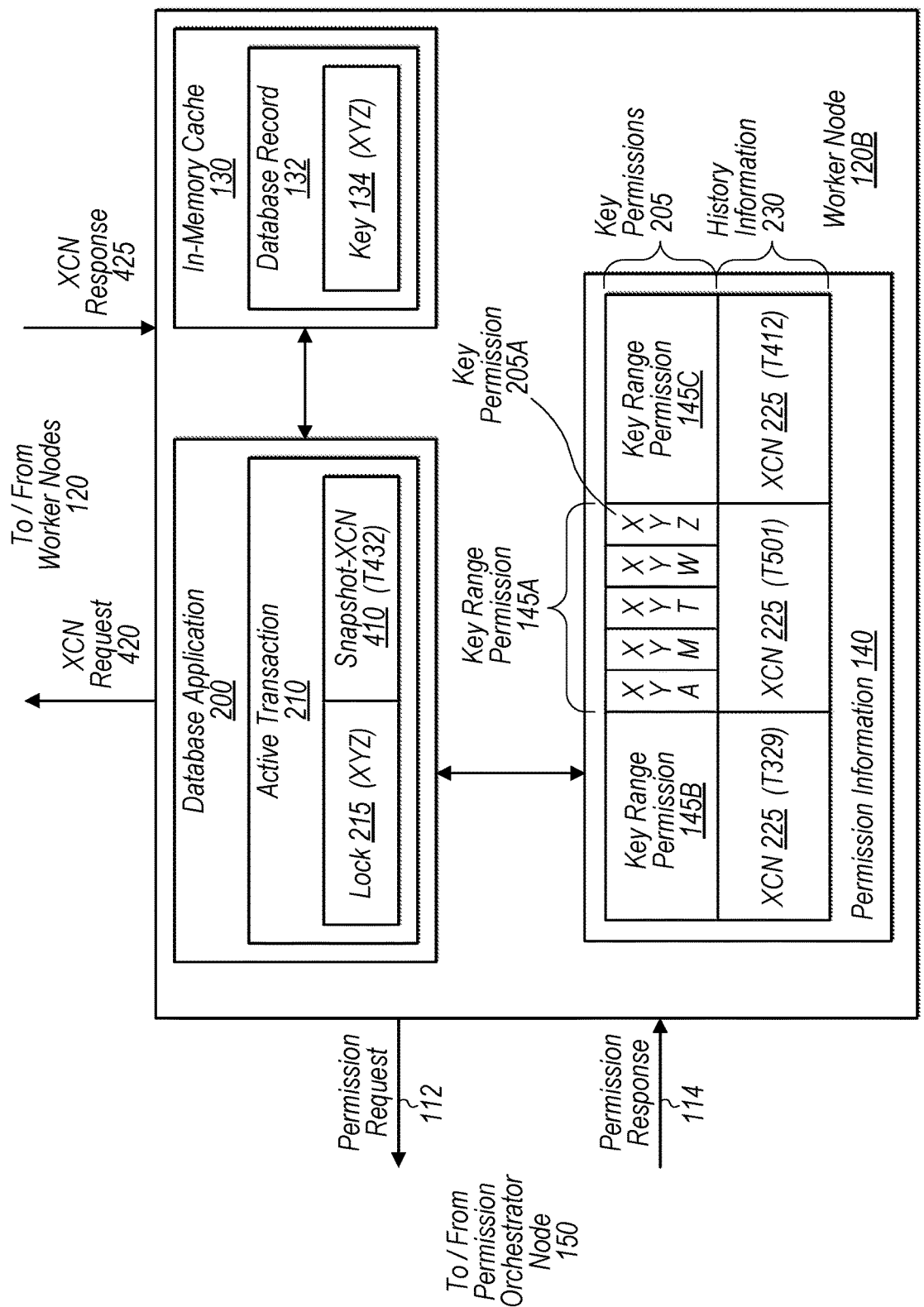
FIG. 4 is a block diagram illustrating example elements of a worker node acquiring key permissions, according to some embodiments.

Turning now to FIG. 4, a block diagram of an example layout relating to a worker node 120 obtaining key permissions 205 is shown. In the illustrated embodiment, worker node 120B includes in-memory cache 130, permission information 140, and database application 200. As shown, database application 200 includes an active transaction 210 associated with a lock 215 (XYZ) and a snapshot-XCN 410 (T432). Also as shown, permission information 140 includes key range permissions 145A-C and associated history information 230. In some embodiments, worker node 120B is implemented differently than shown. For example, database application 200 may process multiple active transactions 210 and multiple committed transactions 220.

As discussed, database application 200 may receive requests to perform transactions to read and write database records 132. Upon receiving a transaction request, database application 200 may initiate a new active transaction 210 based on the received transaction request. When processing that active transaction 210, database application 200 may write various records 132 to in-memory cache 130. When writing a particular record 132, database application 200 may initially determine whether worker node 120B has been provisioned the appropriate permission 205 based on permission information 140. If the appropriate permission 205 is not provisioned to worker node 120B, then worker node 120B may request that permission 205, as previously discussed. Once worker node 120B owns the appropriate permission 205, database application 200 may acquire a lock 215 on that permission 205 before writing the database record 132. In various cases, however, before writing a record 132, database application 200 may ensure that another record 132 has not been committed after a time corresponding to a snapshot-XCN 410 that identifies a state of system 100 that the active transaction 210 is permitted to view.

A snapshot-XCN 410, in various embodiments, is a value that is indicative of the latest XCN 225 whose database records 132 can be read by the corresponding active transaction 210. As shown, active transaction 210 is assigned a snapshot-XCN 410 (T432). Accordingly, active transaction 210 can read committed database records 132 whose XCN 225 is less than or equal to "T432". (In some cases, only database records 132 less than the snapshot-XCN 410 may be read.) For example, active transaction 210 can read, from database 110, a database record 132 that has been stamped with an XCN 225 (T230) (T230<T432).

To ensure the integrity of the data that is stored at system 100, in various embodiments, database application 200 does not write a database record 132 for a particular key 134 if another database record 132 for the same particular key 134 has been committed with an XCN 225 that is greater than the snapshot-XCN 410 assigned to the corresponding active transaction 210. As such, in various embodiments, database application 200 determines, for active transaction 210, whether a database record 132 for a particular key 134 has been committed with an XCN 225 that is greater than snapshot-XCN 410 (T432) based on history information 230. For example, active transaction 210 may involve writing a database record 132 for key 134 (XYZ). Before writing that database record 132, database application 200 may check history information 230 to determine the XCN 225 that is associated with key permission 205A. In some embodiments, history information 230 identifies a respective XCN 225 for each key permission 205. If the XCN 225 associated with key permission 205A is greater than snapshot-XCN 410 (T432), then database application 200 may abort writing the database record 132 for key 134 (XYZ). But if the XCN 225 is not greater than snapshot-XCN 410 (T432), then database application 200 may write that database record 132.

In some embodiments, history information 230 identifies an XCN 225 for an entire key range permission 145. As shown, an XCN 225 (T501) is associated with key range permission 145A, which includes key permission 205A. In response to determining that XCN 225 (T501) for key range permission 145A is greater than snapshot XCN 410 (T432), database application 200 may determine whether key permission 205A itself is associated with a lesser XCN 225—while XCN 225 (T501) is associated with the entire key range permission 145A, it may have been added to history information as a result of a commit of a database record 132 associated with a different key 134 (e.g., XYA) than key 134 XYZ. In order to determine the XCN 225 for a certain key permission 205, in various embodiments, worker node 120B sends an XCN request 420 to worker nodes 120. In some embodiments, history information 230 identifies the last worker node 120 associated with a key permission 205 and thus worker node 120B may send an XCN request 420 to only the identified worker node 120. In some cases, database application 200 may receiver an XCN response 425 that may identify an XCN 225 for the key permission 205 identified in the XCN request 420. If the identified XCN 225 is greater than snapshot-XCN 410 (T432), then database application 200 may abort writing the database record 132 for key 134 (XYZ). But if the XCN 225 is not greater than snapshot-XCN 410 (T432), then database application 200 may write that database record 132.

Figure 5:
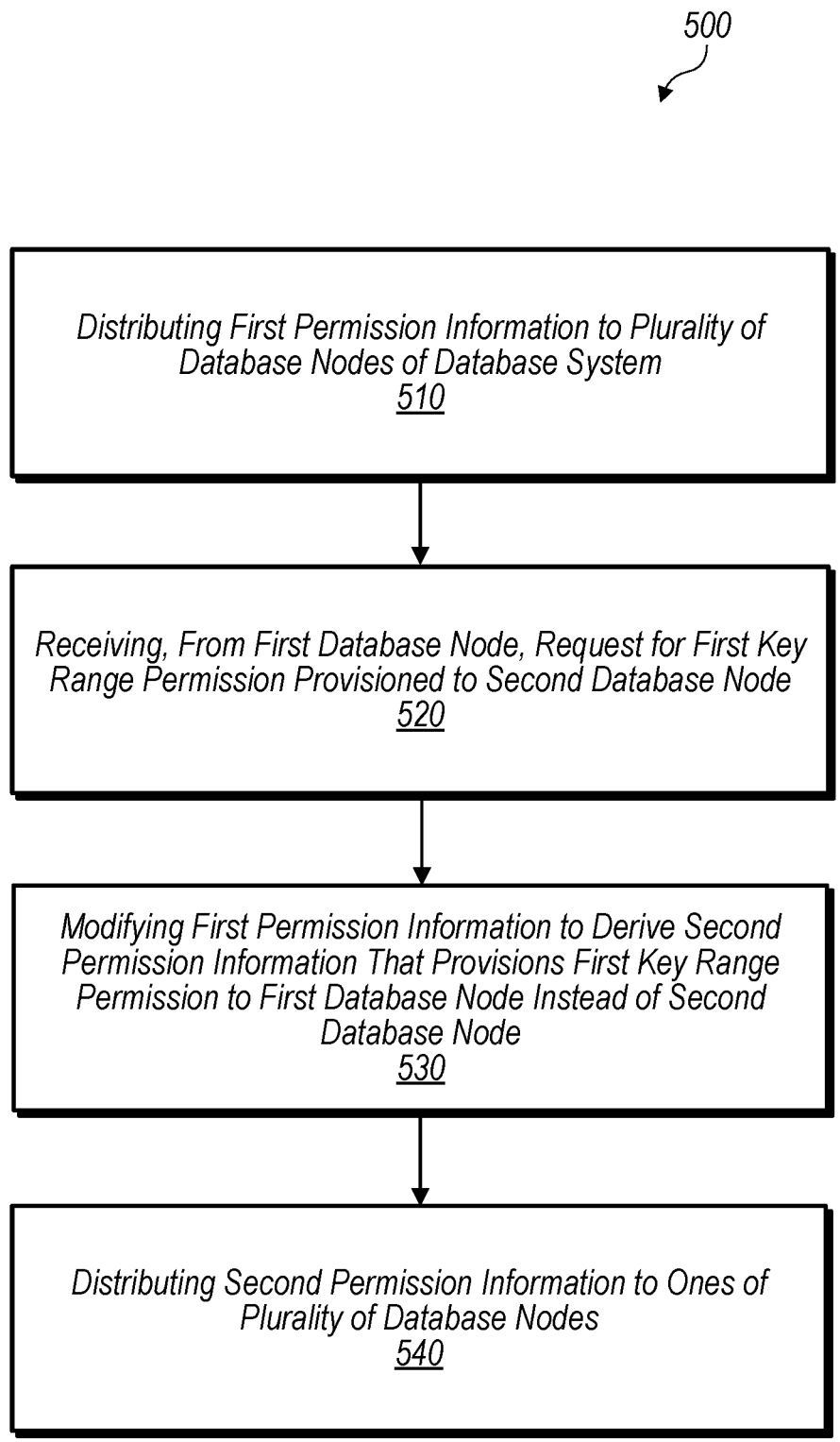
FIGS. 5 and 6 are flow diagrams illustrating example methods that relate to distributing key permissions, according to some embodiments.

Turning now to FIG. 5, a flow diagram of a method 500 is shown. Method 500 is one embodiment of a method performed by a database system (e.g., system 100) to orchestrate the distribution of key range permissions (e.g., key range permissions 145) between a plurality of database nodes (e.g., worker nodes 120) of the database system. Method 500 may be performed by executing program instructions stored on a non-transitory computer-readable medium. In some embodiments, method 500 includes more or less steps than shown. For example, method 500 may include a step in which the database system generates the first permission information.

Method 500 begins in step 510 with the database system distributing first permission information (e.g., permission information 140A) to the plurality of database nodes. The first permission information may identify a distribution of key range permissions to ones of the plurality of database nodes. A given key range permission being distributed to a given database node may permit that given database node to write records (e.g., database records 132) whose keys (e.g., keys 134) fall within a key range associated with the given key range permission. In some cases, the first permission information may provision, to the second database node, a second key range permission that encompasses a first key range permission.

In step 520, the database system receives, from a first database node (e.g., worker node 120B), a request (e.g., a permission request 112) for the first key range permission provisioned to a second database node (e.g., worker node 120A). In various embodiments, the database system sends, to the second database node, a relinquish request (e.g., a relinquish request 152) to relinquish the first key range permission. The second database node may relinquish the first key range permission in response to determining that the first key range permission is not being used in a set of active transactions (e.g., active transactions 210) being performed at the second database node. The database system may receive, from the second database node, an indication (e.g., a relinquish response 154) that the first key range permission has been relinquished. In some cases, the second database node may relinquish the first key range permission but retain the remaining portions of the second key range permission. In some cases, the indication may specify a transaction commit number (e.g., an XCN 225) indicative of a time interval when a latest record was committed for the first key range permission.

In step 530, the database system modifies the first permission information to derive second permission information (e.g., permission information 140B) that provisions the first key range permission to the first database node instead of the second database node. In various embodiments, the second permission information is stored in a trie data structure that includes a plurality of branches, a particular one of which corresponds to the first key range permission.

In step 540, the database system distributes the second permission information to ones of the plurality of database nodes. Distributing the second permission information may include notifying (e.g., via an permission information indication 156) the plurality of database nodes about the second permission information and returning the second permission information in responses to receiving, from the ones of the plurality of database nodes, requests for the second permission information.

In various cases, the second permission information may identify key range transaction commit number that is indicative of a first time interval when a latest record was committed for the first key range permission. In various embodiments, the first database node determines whether a second time interval (e.g., corresponding to a snapshot-XCN 410) associated with the first database node occurs after the first time interval. In response to determining that the second time interval occurs after the first time interval, the first database node may write a database record for a particular key associated with the first key range permission. In response to determining that the second time interval does not occur after the first time interval, the first database node may retrieve, from the database node that committed the most recent record for the particular key, a record transaction commit number for the particular key. The first database node may prevent a record write for the particular key in response to determining that the record transaction commit number is indicative of a time interval that does not occur before the second time interval associated with the first database node. The first database node may write a record for the particular key in response to determining that the record transaction commit number is indicative of a time interval that occurs before the second time interval associated with the first database node.

Figure 6:
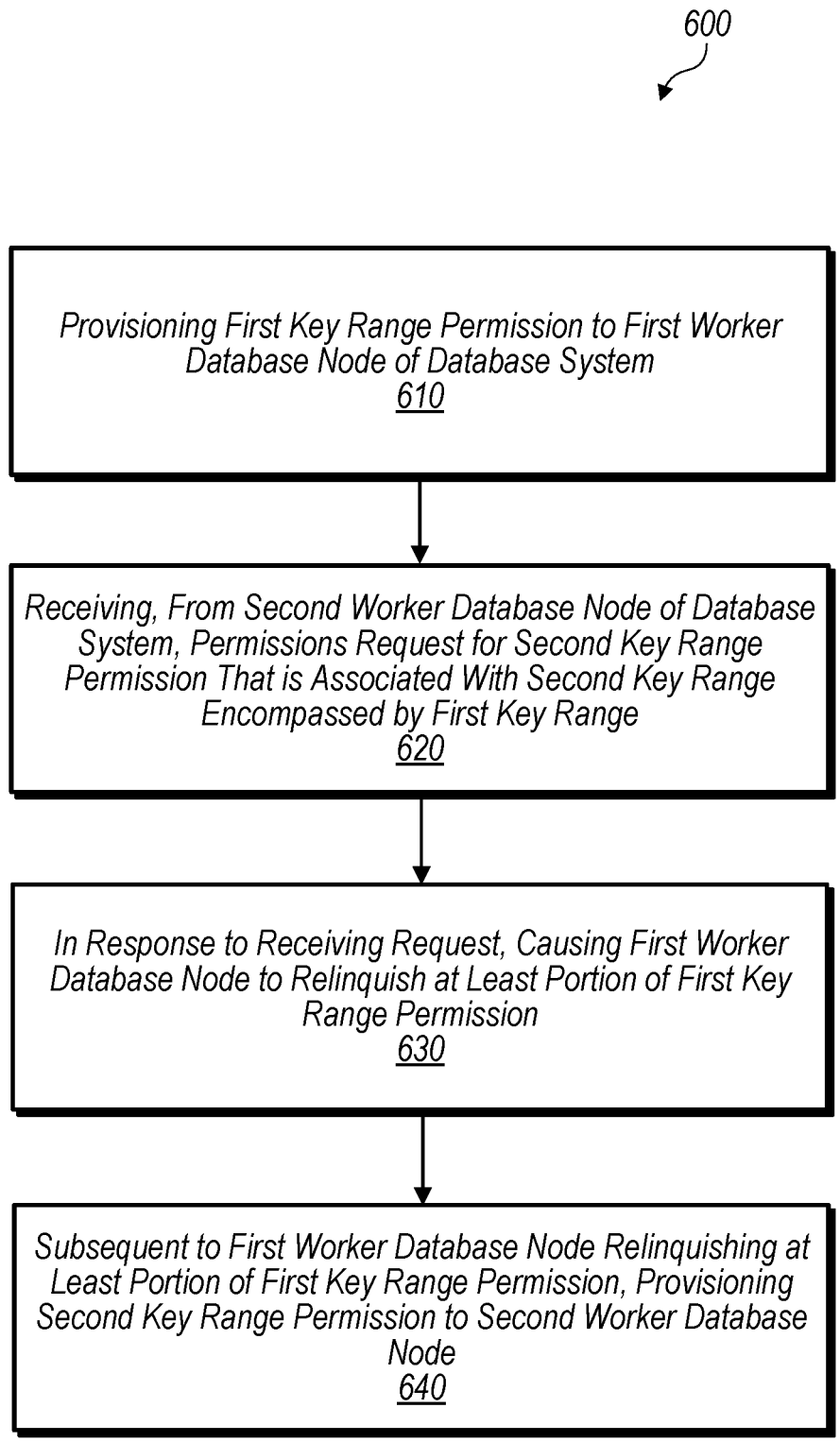

Turning now to FIG. 6, a flow diagram of a method 600 is shown. Method 600 is one embodiment of a method performed by a database system (e.g., system 100) to orchestrate the distribution of key range permissions (e.g., key range permissions 145) between a plurality of database nodes (e.g., worker nodes 120) of the database system. Method 600 may be performed by executing program instructions stored on a non-transitory computer-readable medium. In some embodiments, method 600 includes more or less steps than shown. For example, method 600 may include a step in which the database system generates the first permission information.

Method 600 begins in step 610 with a permission orchestrator database node (e.g., permission orchestrator node 150) provisioning a first key range permission (e.g., a key range permission 145) to a first worker database node (e.g., worker node 120A) of the database system. The first key range permission may permit records (e.g., database records 132) to be written whose keys (e.g., keys 134) fall within a first key range associated with the first key range permission. In step 620, the permission orchestrator database node receives, from a second worker database node (e.g., worker node 120B) of the database system, a permission request (e.g., a permission request 112) for a second key range permission that is associated with a second key range encompassed by the first key range.

In step 630, in response to receiving the permission request, the permission orchestrator database node causes the first worker database node to relinquish at least a portion of the first key range permission. The causing may include sending a relinquish request (e.g., a relinquish request 152) to the first worker database node to relinquish permissions associated with the second key range. The first worker database node may prevent transactions from using keys associated with the second key range in response to receiving the relinquish request. In various cases, the first worker database node may determine that a record associated with a key that falls within the second key range has been written for an in-progress transaction (e.g., an active transaction 210). The first worker database node may commit the in-progress transaction. After committing the in-progress transaction, the first worker database node may return, to the permission orchestrator database node, an indication (e.g., a relinquish response 154) that a portion of the first key range permission that is associated with the second key range has been relinquished.

In step 640, subsequent to the first worker database node relinquishing at least a portion of the first key range permission, the permission orchestrator database node provisions the second key range permission to the second worker database node. In various embodiments, provisioning the second key range permission to the second worker database node includes the permission orchestrator database node providing, to the second worker database node, history information (e.g., history information 230) that indicates one or more writes performed by the first worker database node. The second worker node may determine, based on the history information, whether the first worker database node committed a record having a particular key that falls within the second key range during a particular time interval. In response to determining that the first worker database node committed a record having the particular key during the particular time interval, the second worker database node may abort a portion of a transaction that involves writing a record having the particular key.

Exemplary Multi-Tenant Database System

Figure 7:
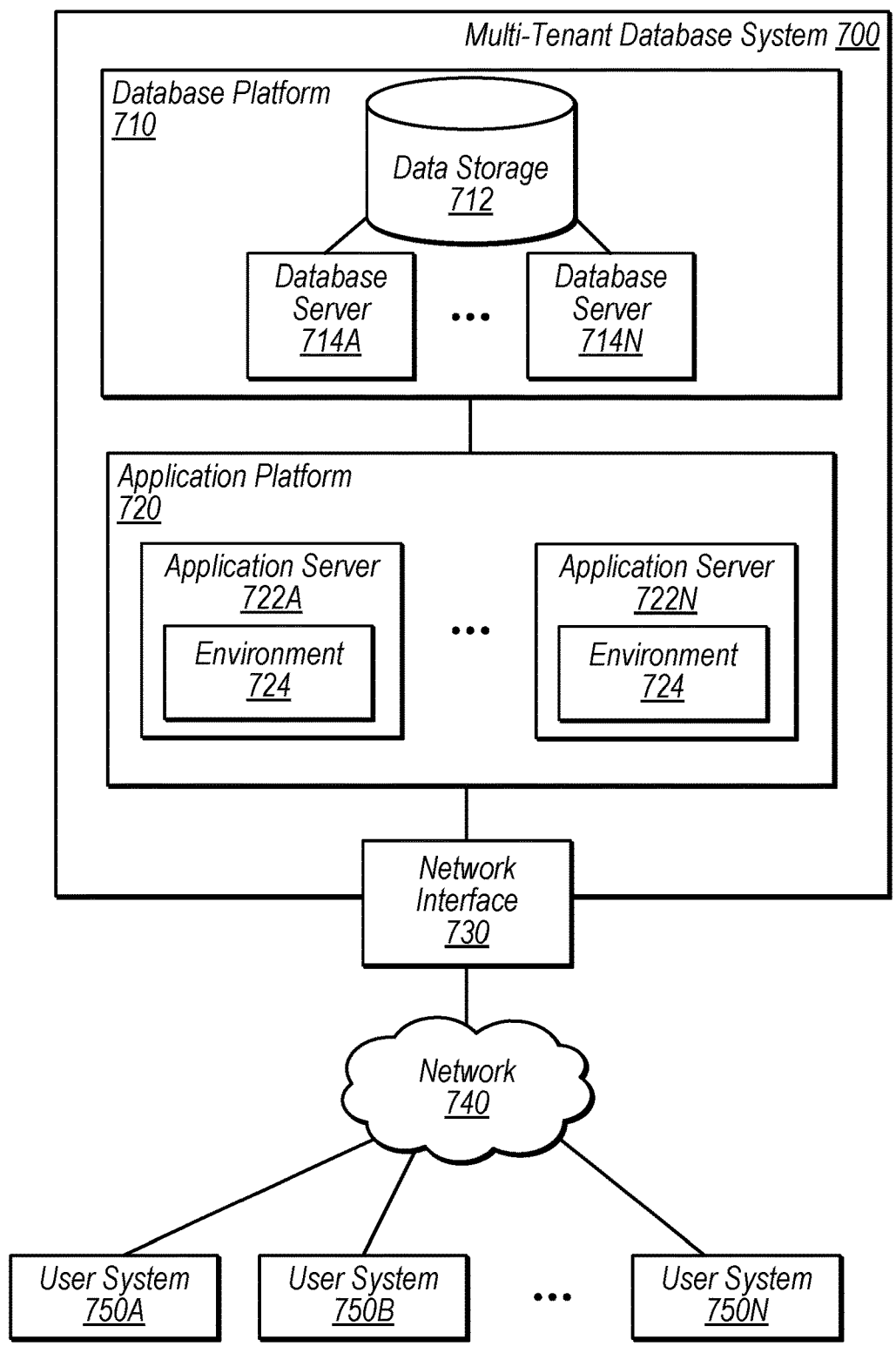
FIG. 7 is a block diagram illustrating elements of a multi-tenant system, according to some embodiments.

Turning now to FIG. 7, an exemplary multi-tenant database system (MTS) 700 in which various techniques of the present disclosure can be implemented is shown—e.g., system 100 may be MTS 700. In FIG. 7, MTS 700 includes a database platform 710, an application platform 720, and a network interface 730 connected to a network 740. Also as shown, database platform 710 includes a data storage 712 and a set of database servers 714A-N that interact with data storage 712, and application platform 720 includes a set of application servers 722A-N having respective environments 724. In the illustrated embodiment, MTS 700 is connected to various user systems 750A-N through network 740. The disclosed multi-tenant system is included for illustrative purposes and is not intended to limit the scope of the present disclosure. In other embodiments, techniques of this disclosure are implemented in non-multi-tenant environments such as client/server environments, cloud computing environments, clustered computers, etc.

MTS 700, in various embodiments, is a set of computer systems that together provide various services to users (alternatively referred to as "tenants") that interact with MTS 700. In some embodiments, MTS 700 implements a customer relationship management (CRM) system that provides mechanism for tenants (e.g., companies, government bodies, etc.) to manage their relationships and interactions with customers and potential customers. For example, MTS 700 might enable tenants to store customer contact information (e.g., a customer's website, email address, telephone number, and social media data), identify sales opportunities, record service issues, and manage marketing campaigns. Furthermore, MTS 700 may enable those tenants to identify how customers have been communicated with, what the customers have bought, when the customers last purchased items, and what the customers paid. To provide the services of a CRM system and/or other services, as shown, MTS 700 includes a database platform 710 and an application platform 720.

Database platform 710, in various embodiments, is a combination of hardware elements and software routines that implement database services for storing and managing data of MTS 700, including tenant data. As shown, database platform 710 includes data storage 712. Data storage 712, in various embodiments, includes a set of storage devices (e.g., solid state drives, hard disk drives, etc.) that are connected together on a network (e.g., a storage attached network (SAN)) and configured to redundantly store data to prevent data loss. In various embodiments, data storage 712 is used to implement a database (e.g., database 110) comprising a collection of information that is organized in a way that allows for access, storage, and manipulation of the information. Data storage 712 may implement a single database, a distributed database, a collection of distributed databases, a database with redundant online or offline backups or other redundancies, etc. As part of implementing the database, data storage 712 may store files (e.g., files 115) that include one or more database records having respective data payloads (e.g., values for fields of a database table) and metadata (e.g., a key value, timestamp, table identifier of the table associated with the record, tenant identifier of the tenant associated with the record, etc.).

In various embodiments, a database record may correspond to a row of a table. A table generally contains one or more data categories that are logically arranged as columns or fields in a viewable schema. Accordingly, each record of a table may contain an instance of data for each category defined by the fields. For example, a database may include a table that describes a customer with fields for basic contact information such as name, address, phone number, fax number, etc. A record therefore for that table may include a value for each of the fields (e.g., a name for the name field) in the table. Another table might describe a purchase order, including fields for information such as customer, product, sale price, date, etc. In various embodiments, standard entity tables are provided for use by all tenants, such as tables for account, contact, lead and opportunity data, each containing pre-defined fields. MTS 700 may store, in the same table, database records for one or more tenants—that is, tenants may share a table. Accordingly, database records, in various embodiments, include a tenant identifier that indicates the owner of a database record. As a result, the data of one tenant is kept secure and separate from that of other tenants so that that one tenant does not have access to another tenant's data, unless such data is expressly shared.

In some embodiments, the data stored at data storage 712 is organized as part of a log-structured merge-tree (LSM tree). An LSM tree normally includes two high-level components: an in-memory cache and a persistent storage. In operation, a database server 714 may initially write database records into a local in-memory cache before later flushing those records to the persistent storage (e.g., data storage 712). As part of flushing database records, the database server 714 may write the database records into new files that are included in a "top" level of the LSM tree. Over time, the database records may be rewritten by database servers 714 into new files included in lower levels as the database records are moved down the levels of the LSM tree. In various implementations, as database records age and are moved down the LSM tree, they are moved to slower and slower storage devices (e.g., from a solid state drive to a hard disk drive) of data storage 712.

When a database server 714 wishes to access a database record for a particular key, the database server 714 may traverse the different levels of the LSM tree for files that potentially include a database record for that particular key. If the database server 714 determines that a file may include a relevant database record, the database server 714 may fetch the file from data storage 712 into a memory of the database server 714. The database server 714 may then check the fetched file for a database record having the particular key. In various embodiments, database records are immutable once written to data storage 712. Accordingly, if the database server 714 wishes to modify the value of a row of a table (which may be identified from the accessed database record), the database server 714 writes out a new database record to the top level of the LSM tree. Over time, that database record is merged down the levels of the LSM tree. Accordingly, the LSM tree may store various database records for a database key where the older database records for that key are located in lower levels of the LSM tree then newer database records.

Database servers 714, in various embodiments, are hardware elements, software routines, or a combination thereof capable of providing database services, such as data storage, data retrieval, and/or data manipulation. A database server 714 may correspond to a worker node 120. Such database services may be provided by database servers 714 to components (e.g., application servers 722) within MTS 700 and to components external to MTS 700. As an example, a database server 714 may receive a database transaction request from an application server 722 that is requesting data to be written to or read from data storage 712. The database transaction request may specify an SQL SELECT command to select one or more rows from one or more database tables. The contents of a row may be defined in a database record and thus database server 714 may locate and return one or more database records that correspond to the selected one or more table rows. In various cases, the database transaction request may instruct database server 714 to write one or more database records for the LSM tree—database servers 714 maintain the LSM tree implemented on database platform 710. In some embodiments, database servers 714 implement a relational database management system (RDMS) or object oriented database management system (OODBMS) that facilitates storage and retrieval of information against data storage 712. In various cases, database servers 714 may communicate with each other to facilitate the processing of transactions. For example, database server 714A may communicate with database server 714N to determine if database server 714N has written a database record into its in-memory cache for a particular key.

Application platform 720, in various embodiments, is a combination of hardware elements and software routines that implement and execute CRM software applications as well as provide related data, code, forms, web pages and other information to and from user systems 750 and store related data, objects, web page content, and other tenant information via database platform 710. In order to facilitate these services, in various embodiments, application platform 720 communicates with database platform 710 to store, access, and manipulate data. In some instances, application platform 720 may communicate with database platform 710 via different network connections. For example, one application server 722 may be coupled via a local area network and another application server 722 may be coupled via a direct network link. Transfer Control Protocol and Internet Protocol (TCP/IP) are exemplary protocols for communicating between application platform 770 and database platform 710, however, it will be apparent to those skilled in the art that other transport protocols may be used depending on the network interconnect used.

Application servers 722, in various embodiments, are hardware elements, software routines, or a combination thereof capable of providing services of application platform 720, including processing requests received from tenants of MTS 700. Application servers 722, in various embodiments, can spawn environments 724 that are usable for various purposes, such as providing functionality for developers to develop, execute, and manage applications (e.g., business logic). Data may be transferred into an environment 724 from another environment 724 and/or from database platform 710. In some cases, environments 724 cannot access data from other environments 724 unless such data is expressly shared. In some embodiments, multiple environments 724 can be associated with a single tenant.

Application platform 720 may provide user systems 750 access to multiple, different hosted (standard and/or custom) applications, including a CRM application and/or applications developed by tenants. In various embodiments, application platform 720 may manage creation of the applications, testing of the applications, storage of the applications into database objects at data storage 712, execution of the applications in an environment 724 (e.g., a virtual machine of a process space), or any combination thereof. In some embodiments, application platform 720 may add and remove application servers 722 from a server pool at any time for any reason, there may be no server affinity for a user and/or organization to a specific application server 722. In some embodiments, an interface system (not shown) implementing a load balancing function (e.g., an F5 Big-IP load balancer) is located between the application servers 722 and the user systems 750 and is configured to distribute requests to the application servers 722. In some embodiments, the load balancer uses a least connections algorithm to route user requests to the application servers 722. Other examples of load balancing algorithms, such as are round robin and observed response time, also can be used. For example, in certain embodiments, three consecutive requests from the same user could hit three different servers 722, and three requests from different users could hit the same server 722.

In some embodiments, MTS 700 provides security mechanisms, such as encryption, to keep each tenant's data separate unless the data is shared. If more than one server 714 or 722 is used, they may be located in close proximity to one another (e.g., in a server farm located in a single building or campus), or they may be distributed at locations remote from one another (e.g., one or more servers 714 located in city A and one or more servers 722 located in city B). Accordingly, MTS 700 may include one or more logically and/or physically connected servers distributed locally or across one or more geographic locations.

One or more users (e.g., via user systems 750) may interact with MTS 700 via network 740. User system 750 may correspond to, for example, a tenant of MTS 700, a provider (e.g., an administrator) of MTS 700, or a third party. Each user system 750 may be a desktop personal computer, workstation, laptop, PDA, cell phone, or any Wireless Access Protocol (WAP) enabled device or any other computing device capable of interfacing directly or indirectly to the Internet or other network connection. User system 750 may include dedicated hardware configured to interface with MTS 700 over network 740. User system 750 may execute a graphical user interface (GUI) corresponding to MTS 700, an HTTP client (e.g., a browsing program, such as Microsoft's Internet Explorer™ browser, Netscape's Navigator™ browser, Opera's browser, or a WAP-enabled browser in the case of a cell phone, PDA or other wireless device, or the like), or both, allowing a user (e.g., subscriber of a CRM system) of user system 750 to access, process, and view information and pages available to it from MTS 700 over network 740. Each user system 750 may include one or more user interface devices, such as a keyboard, a mouse, touch screen, pen or the like, for interacting with a graphical user interface (GUI) provided by the browser on a display monitor screen, LCD display, etc. in conjunction with pages, forms and other information provided by MTS 700 or other systems or servers. As discussed above, disclosed embodiments are suitable for use with the Internet, which refers to a specific global internetwork of networks. It should be understood, however, that other networks may be used instead of the Internet, such as an intranet, an extranet, a virtual private network (VPN), a non-TCP/IP based network, any LAN or WAN or the like.

Because the users of user systems 750 may be users in differing capacities, the capacity of a particular user system 750 might be determined one or more permission levels associated with the current user. For example, when a salesperson is using a particular user system 750 to interact with MTS 700, that user system 750 may have capacities (e.g., user privileges) allotted to that salesperson. But when an administrator is using the same user system 750 to interact with MTS 700, the user system 750 may have capacities (e.g., administrative privileges) allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level. There may also be some data structures managed by MTS 700 that are allocated at the tenant level while other data structures are managed at the user level.

In some embodiments, a user system 750 and its components are configurable using applications, such as a browser, that include computer code executable on one or more processing elements. Similarly, in some embodiments, MTS 700 (and additional instances of MTSs, where more than one is present) and their components are operator configurable using application(s) that include computer code executable on processing elements. Thus, various operations described herein may be performed by executing program instructions stored on a non-transitory computer-readable medium and executed by processing elements. The program instructions may be stored on a non-volatile medium such as a hard disk, or may be stored in any other volatile or non-volatile memory medium or device as is well known, such as a ROM or RAM, or provided on any media capable of staring program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the disclosed embodiments can be implemented in any programming language that can be executed on a server or server system such as, for example, in C, C+, HTML, Java, JavaScript, or any other scripting language, such as VBScript.

Network 740 may be a LAN (local area network), WAN (wide area network), wireless network, point-to-point network, star network, token ring network, hub network, or any other appropriate configuration. The global internetwork of networks, often referred to as the "Internet" with a capital "I," is one example of a TCP/IP (Transfer Control Protocol and Internet Protocol) network. It should be understood, however, that the disclosed embodiments may utilize any of various other types of networks.

User systems 750 may communicate with MTS 700 using TCP/IP and, at a higher network level, use other common Internet protocols to communicate, such as HTTP, FTP, AFS, WAP, etc. For example, where HTTP is used, user system 750 might include an HTTP client commonly referred to as a "browser" for sending and receiving HTTP messages from an HTTP server at MTS 700. Such a server might be implemented as the sole network interface between MTS 700 and network 740, but other techniques might be used as well or instead. In some implementations, the interface between MTS 700 and network 740 includes load sharing functionality, such as round-robin HTTP request distributors to balance loads and distribute incoming HTTP requests evenly over a plurality of servers.

In various embodiments, user systems 750 communicate with application servers 722 to request and update system-level and tenant-level data from MTS 700 that may require one or more queries to data storage 712. In some embodiments, MTS 700 automatically generates one or more SQL statements (the SQL query) designed to access the desired information. In some cases, user systems 750 may generate requests having a specific format corresponding to at least a portion of MTS 700. As an example, user systems 750 may request to move data objects into a particular environment 724 using an object notation that describes an object relationship mapping (e.g., a JavaScript object notation mapping) of the specified plurality of objects.

Exemplary Computer System

Figure 8:
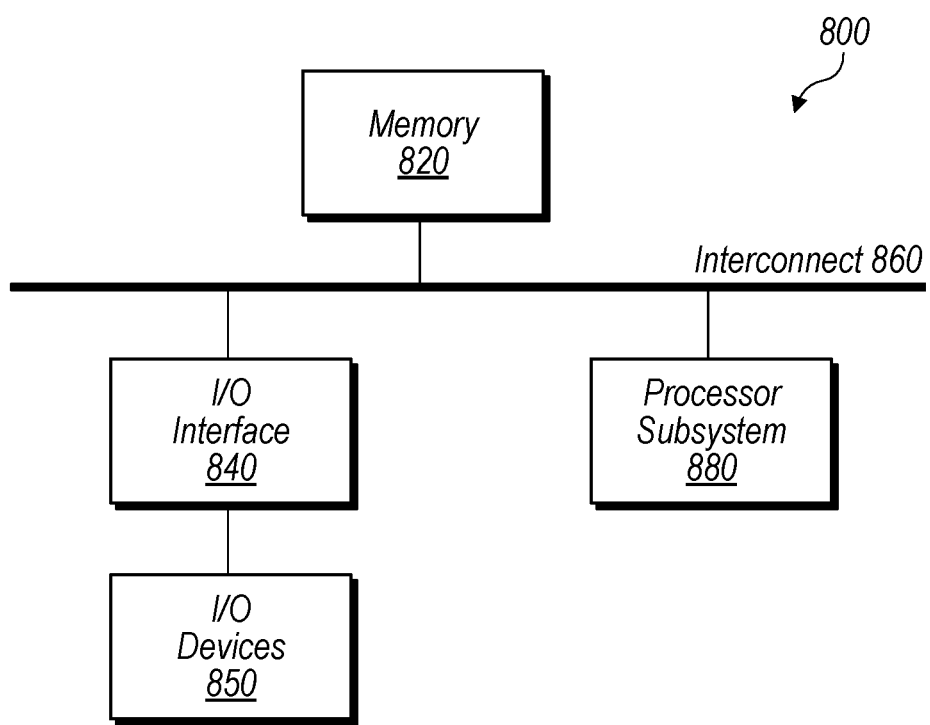
FIG. 8 is a block diagram illustrating elements of a computer system, according to some embodiments.

Turning now to FIG. 8, a block diagram of an exemplary computer system 800, which may implement system 100, database 110, worker node 120, MTS 700, and/or user system 750, is depicted. Computer system 800 includes a processor subsystem 880 that is coupled to a system memory 820 and I/O interfaces(s) 840 via an interconnect 860 (e.g., a system bus). I/O interface(s) 840 is coupled to one or more I/O devices 850. Although a single computer system 800 is shown in FIG. 8 for convenience, system 800 may also be implemented as two or more computer systems operating together.

Processor subsystem 880 may include one or more processors or processing units. In various embodiments of computer system 800, multiple instances of processor subsystem 880 may be coupled to interconnect 860. In various embodiments, processor subsystem 880 (or each processor unit within 880) may contain a cache or other form of on-board memory.

System memory 820 is usable store program instructions executable by processor subsystem 880 to cause system 800 perform various operations described herein. System memory 820 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 800 is not limited to primary storage such as memory 820. Rather, computer system 800 may also include other forms of storage such as cache memory in processor subsystem 880 and secondary storage on I/O Devices 850 (e.g., a hard drive, storage array, etc.). In some embodiments, these other forms of storage may also store program instructions executable by processor subsystem 880. In some embodiments, program instructions that when executed implement database application 200 may be included/stored within system memory 820.

I/O interfaces 840 may be any of various types of interfaces configured to couple to and communicate with other devices, according to various embodiments. In one embodiment, I/O interface 840 is a bridge chip (e.g., Southbridge) from a front-side to one or more back-side buses. I/O interfaces 840 may be coupled to one or more I/O devices 850 via one or more corresponding buses or other interfaces. Examples of I/O devices 850 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 800 is coupled to a network via a network interface device 850 (e.g., configured to communicate over WiFi, Bluetooth, Ethernet, etc.).

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

Unless stated otherwise, the specific embodiments are not intended to limit the scope of claims that are drafted based on this disclosure to the disclosed forms, even where only a single example is described with respect to a particular feature. The disclosed embodiments are thus intended to be illustrative rather than restrictive, absent any statements to the contrary. The application is intended to cover such alternatives, modifications, and equivalents that would be apparent to a person skilled in the art having the benefit of this disclosure.

Particular features, structures, or characteristics may be combined in any suitable manner consistent with this disclosure. The disclosure is thus intended to include any feature or combination of features disclosed herein (either explicitly or implicitly), or any generalization thereof. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

For example, while the appended dependent claims are drafted such that each depends on a single other claim, additional dependencies are also contemplated, including the following: claim 5 could depend from any preceding claim; claim 6 could depend from any preceding claim; claim 9 could depend from any preceding claim; claim 15 could depend from any of claims 11-14; and claim 19 could depend from any of claims 16-18. Where appropriate, it is also contemplated that claims drafted in one statutory type (e.g., apparatus) suggest corresponding claims of another statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to the singular forms such "a," "an," and "the" are intended to mean "one or more" unless the context clearly dictates otherwise. Reference to "an item" in a claim thus does not preclude additional instances of the item.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," covering x but not y, y but not x, and both x and y.

On the hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one of element of the set [w, x, y, z], thereby covering all possible combinations in this list of options. This phrase is not to be interpreted to require that there is at least one instance of w, at least one instance of x, at least one instance of y, and at least one instance of z.

Various "labels" may proceed nouns in this disclosure. Unless context provides otherwise, different labels used for a feature (e.g., "first circuit," "second circuit," "particular circuit," "given circuit," etc.) refer to different instances of the feature. The labels "first," "second," and "third" when applied to a particular feature do not imply any type of ordering (e.g., spatial, temporal, logical, etc.), unless stated otherwise.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function. This unprogrammed FPGA may be "configurable to" perform that function, however.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

In this disclosure, various "modules" operable to perform designated functions are shown in the figures and described in detail above. As used herein, a "module" refers to software or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC. Accordingly, a module that is described as being "executable" to perform operations refers to a software module, while a module that is described as being "configured" to perform operations refers to a hardware module. A module that is described as "operable" to perform operations refers to a software module, a hardware module, or some combination thereof. Further, for any discussion herein that refers to a module that is "executable" to perform certain operations, it is to be understood that those operations may be implemented, in other embodiments, by a hardware module "configured" to perform the operations, and vice versa.

What is claimed is:

1. A method, comprising:
   receiving, by a database node of a database system and from a permission orchestrator database node, permission information that specifies a provisioning of a key range permission to the database node that permits the database node to write records whose keys fall within a key range identified by the key range permission;
   receiving, by the database node and from the permission orchestrator database node, a request to relinquish ownership of at least a portion of the key range;
   determining, by the database node, whether there are any transactions executing at the database node that have locked the at least a portion of the key range for a record commit; and
   in response to determining that there are no transactions that have a lock on the at least a portion, the database node providing, to the permission orchestrator database node, a response that relinquishes the ownership of the at least a portion of the key range.

2. The method of claim 1, wherein the response indicates when a latest committed record for the at least a portion of the key range was committed.

3. The method of claim 1, wherein the response relinquishes a larger portion of the key range than the at least a portion requested by the permission orchestrator database node, and wherein the larger portion encompasses the at least a portion.

4. The method of claim 1, further comprising:
   prior to receiving the permission information, the database node making a determination that the database node does not have permission to write a record for a particular key of the key range; and in response to making the determination, the database node issuing a request to the permission orchestrator database node for permission to write records for the particular key.

5. The method of claim 1, further comprising:
writing a record for a particular key of the key range in response to determining that a transaction involving the record is associated with a first time indicator that indicates a time later than a second time indicator associated with the particular key.

6. The method of claim 5, wherein the permission information specifies history information having the second time indicator associated with the particular key.

7. The method of claim 1, further comprising:
in response to determining that another database node committed a record for a particular key of the key range during a particular time interval, aborting a transaction that involves writing a record for the particular key.

8. The method of claim 1, further comprising:
receiving, by the database node and from the permission orchestrator database node, additional permission information that indicates that a particular key range permission for the at least a portion has been provisioned to another database node.

9. The method of claim 1, wherein the permission information is stored in a trie data structure that includes a plurality of branches, a particular branch of which corresponds to the key range permission.

10. The method of claim 1, wherein the database node is one of a plurality of worker database nodes that writes records to a database shared among the plurality of worker database nodes.

11. A non-transitory computer readable medium having program instructions stored thereon that are capable of causing a database node of a database system to perform operations comprising:
receiving, from a permission orchestrator database node, permission information that specifies a provisioning of a key range permission to the database node that permits the database node to write records whose keys fall within a key range identified by the key range permission;
receiving, from the permission orchestrator database node, a request to relinquish ownership of at least a portion of the key range;
determining whether there are any transactions executing at the database node that have locked the at least a portion of the key range for a record commit; and
in response to determining that there are no transactions that have a lock on the at least a portion, providing, to the permission orchestrator database node, a response that relinquishes the ownership of the at least a portion of the key range.

12. The non-transitory computer readable medium of claim 11, wherein the operations further comprise:
in response to determining that there is at least one transaction that has a lock for the at least a portion, waiting to provide the response until the at least one transaction has committed or aborted.

13. The non-transitory computer readable medium of claim 11, wherein the response identifies a transaction commit number indicative of a time period when a latest committed record for the at least a portion was committed.

14. The non-transitory computer readable medium of claim 11, wherein the response relinquishes the key range entirely.

15. The non-transitory computer readable medium of claim 11, wherein the operations further comprise:
prior to receiving the permission information, sending a request to the permission orchestrator database node for permission to write records for a particular key, wherein the key range encompasses a plurality of keys that includes the particular key.

16. A system, comprising:
at least one processor; and
memory having program instructions stored thereon that are executable by the at least one processor to cause the system to perform operations comprising:
receiving, from a permission orchestrator system, permission information that specifies a provisioning of a key range permission to the system that permits the system to write records whose keys fall within a key range identified by the key range permission;
receiving, from the permission orchestrator system, a request to relinquish ownership of at least a portion of the key range;
determining whether there are any transactions executing at the system that have locked the at least a portion of the key range for a record commit; and
in response to determining that there are no transactions that have a lock on the at least a portion, providing, to the permission orchestrator system, a response that relinquishes the ownership of the at least a portion of the key range.

17. The system of claim 16, wherein the permission information is associated with history information that identifies a transaction commit number of a latest committed transaction for the key range.

18. The system of claim 16, wherein operations further comprise:
including, in the response, history information that indicates when a latest committed record for the at least a portion was committed by the system.

19. The system of claim 16, wherein the operations further comprise:
writing a record for a particular key of the key range in response to determining that a transaction that involves the writing is associated with a snapshot transaction commit number (snapshot XCN) that is greater than an XCN associated with the particular key.

20. The system of claim 16, wherein the operations further comprise:
in response to determining that another system committed a record having a particular key of the key range during a particular time interval, aborting at least a portion of a transaction that involves writing a record having the particular key.

* * * * *